United States Patent
Jeon et al.

(10) Patent No.: US 10,088,652 B2
(45) Date of Patent: Oct. 2, 2018

(54) IMAGING LENS AND IMAGING APPARATUS INCLUDING THE SAME

(71) Applicant: Samsung Electronics Co., Ltd., Gyeonggi-do (KR)

(72) Inventors: Sang-yong Jeon, Gyeonggi-do (KR); Sung-wook Choi, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 198 days.

(21) Appl. No.: 15/015,235

(22) Filed: Feb. 4, 2016

(65) Prior Publication Data
US 2016/0246033 A1    Aug. 25, 2016

(30) Foreign Application Priority Data
Feb. 24, 2015    (KR) .................. 10-2015-0025910

(51) Int. Cl.
| | | |
|---|---|---|
| G02B 3/02 | (2006.01) | |
| G02B 21/02 | (2006.01) | |
| G02B 13/02 | (2006.01) | |
| G02B 13/04 | (2006.01) | |
| G02B 9/60 | (2006.01) | |
| G02B 13/00 | (2006.01) | |

(52) U.S. Cl.
CPC ........... *G02B 13/0045* (2013.01); *G02B 9/60* (2013.01)

(58) Field of Classification Search
CPC ........ G02B 13/18; G02B 21/02; G02B 13/02; G02B 13/04; G02B 9/60
USPC .................. 359/713–714, 659, 746, 753, 763
See application file for complete search history.

(56) References Cited

U.S. PATENT DOCUMENTS

| | | |
|---|---|---|
| 8,649,113 B1 | 2/2014 | Tsai et al. |
| 8,717,689 B2 | 5/2014 | Chen |
| 8,792,185 B2 | 7/2014 | Hsu et al. |
| 2013/0100541 A1 | 4/2013 | Huang et al. |
| 2014/0085735 A1 | 3/2014 | Shih |

FOREIGN PATENT DOCUMENTS

| | | |
|---|---|---|
| JP | 2010-008562 A | 1/2010 |
| JP | 2012-211935 A | 11/2012 |

*Primary Examiner* — Dawayne A Pinkney
(74) *Attorney, Agent, or Firm* — Cha & Reiter, LLC.

(57) ABSTRACT

An imaging lens is provided comprising: a first lens having a negative refractive power; a second lens having a positive refractive power and having a convex object side surface; a third lens having a negative refractive power; a fourth lens having a convex image side surface; and a fifth lens having an image side surface, the image side surface having an inflection point, wherein the first, second, third, fourth, and fifth lenses are sequentially arranged from a front end of the imaging lens to a rear end of the imaging lens, and the imaging lens.

16 Claims, 14 Drawing Sheets

IMAGING LENS AND IMAGING APPARATUS INCLUDING THE SAME

CLAIM OF PRIORITY

This application claims the benefit of Korean Patent Application No. 10-2015-0025910, filed on Feb. 24, 2015, in the Korean Intellectual Property Office, the disclosure of which is incorporated herein in its entirety by reference.

BACKGROUND

1. Field of the Disclosure

The present disclosure relates to optical devices, in general, and more particularly to an imaging lens and imaging apparatus including the same.

2. Description of the Related Art

A digital camera or a video camera, having a solid-state imaging device such as a charge-coupled device (CCD), a complementary metal-oxide semiconductor (CMOS), or the like, have recently widely been distributed.

A pixel integration of a solid-state imaging device has increased to increase a resolution of a camera. Also, the camera has been made small and light through a performance improvement of an imaging lens embedded in the camera. Since an imaging apparatus using a solid-state imaging device is appropriate to be small, the imaging apparatus has been applied to a mobile device such as a smartphone or the like.

In general, to secure an optical performance, a large number of lenses may be used. In this case, a camera is inappropriate to be small, light, and price-competitive. If there are a small number of lenses, the camera is appropriate in terms of price competitiveness, but an aberration correction may not be sufficient.

A thickness of a body of a smartphone has been slim, and a miniaturization of an imaging lens module used in the smartphone has been more significant. Also, as professionalisms of consumers of cameras increase, a design plan is demanded to realize a miniaturization and an optical performance appropriate for a purpose. Therefore, there is a need for a design for an imaging lens capable of securing desired performance, while also achieving a small size, low weight, and low cost.

SUMMARY

Provided are methods and apparatuses for an imaging lens having a high aberration characteristic and a wide angle, and an imaging apparatus including the same.

According to one aspect of the disclosure, an imaging lens is provided comprising: a first lens having a negative refractive power; a second lens having a positive refractive power and having a convex object side surface; a third lens having a negative refractive power; a fourth lens having a convex image side surface; and a fifth lens having an image side surface, the image side surface having an inflection point, wherein the first, second, third, fourth, and fifth lenses are sequentially arranged from a front end of the imaging lens to a rear end of the imaging lens, and the imaging lens satisfies the following condition: $2.1<f<2.8$, and $D_{p5s2i}-D_{p5s2m}<0.74$, wherein f denotes a focal length of the imaging lens, $D_{p5s2i}$ denotes a length on an optical axis from the image side surface of the fifth lens to an image plane associated with the lens, and $D_{p5s2m}$ denotes a length from a point of the image side surface of the fifth lens on the optical axis to a point projected on the optical axis from a most convex point of the image side surface of the fifth lens.

According to another aspect of the disclosure, an imaging apparatus is provided comprising: the imaging lens; and an image sensor configured to convert an optical image formed through the imaging lens into an electrical signal.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
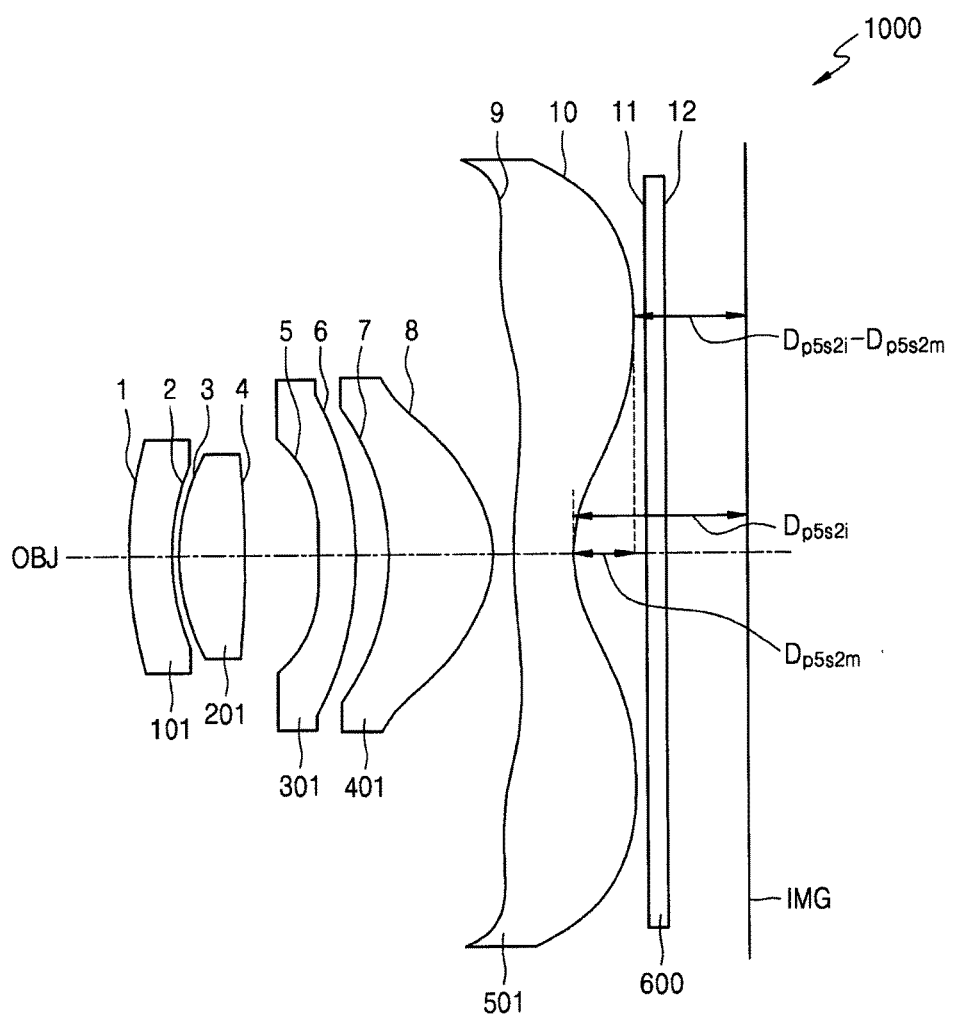
FIG. 1 is a diagram of an example of an imaging lens, according to aspects of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

As will be discussed further below, an imaging lens is disclosed including a plurality lenses. As used throughout the disclosure, "an object side surface" of each lens is a lens surface that would be facing an object (OBJ) when the imaging lens is used to photograph the object. As used throughout the disclosure, "an image side surface" of each lens is a lens surface that would be facing an image plane associated with the imaging lens when the imaging lens is used to photograph the object. According to aspects of the disclosure, the imaging lens may include a front end and a rear end. As used throughout the disclosure, a "front end" of the imaging lens is an end of the lens that is closer to the object than the "rear end" when the lens is used to photograph the object.

"Expressions such as "at least one of," when preceding a list of elements, modify the entire list of elements and do not modify the individual elements of the list.

FIG. 1 is a diagram of an example of an imaging lens 1000, according to aspects of the disclosure. As illustrated, the imaging lens 1000 includes a first lens 101, a second lens 201, a third lens 301, a fourth lens 401, and a fifth lens 501 that are sequentially arranged from an object OBJ toward an image plane IMG (e.g., from the front end of the lens to the rear end). The first lens 101 may have a negative refractive power, and a surface 1 of the first lens 101 facing the object OBJ may have a convex shape. The second lens 201 may have a positive refractive power, and a surface 3 of the second lens 201 facing the object OBJ may have a convex shape. The third lens 301 may have a negative refractive power, and a surface 6 of the third lens 301 facing the image plane IMG may have a convex shape. A surface 8 of the fourth lens 401 facing the image plane IMG may have a convex shape. A surface 10 of the fifth lens 501 facing the image plane IMG may have a shape having an inflection point and may have a concave shape around the optical axis.

A filter 600 may be further disposed between the fifth lens 501 and the image plane IMG. The filter 600 may be, for example, an infrared cut-off filter. The filter 600 may be omitted, and a cover glass may be selectively disposed between the fifth lens 501 and the image plane IMG. An image sensor (not shown), such as a charge-coupled device (CCD), a complementary metal-oxide semiconductor (CMOS), or the like, is installed on the image plane IMG.

According to aspects of the disclosure, the shapes of the first lens 101, the second lens 201, the third lens 301, the fourth lens 401, and the fifth lens 501 may help to reduce the full length of the imaging lens and achieve a high optical performance.

The imaging lens 1000 satisfies the following condition:

$$2.1 < f < 2.8 \quad (1)$$

wherein f denotes a focal length of the imaging lens 1000.

The condition (1) provides a focal length range that the imaging lens 1000 is to achieve.

The imaging lens 1000 may satisfy the condition (1) and may further satisfy additional conditions for aberration correction, optical performance, and size.

The imaging lens 1000 may satisfy the following condition:

$$D_{p5s2i} - D_{p5s2m} < 0.74 \quad (2)$$

wherein $D_{p5s2i}$ denotes a distance on an optical axis from an image side surface 10 of the fifth lens 501 to the image plane IMG, and $D_{p5s2m}$ denotes a distance from a point of an image side surface 10 of the fifth lens 501 on the optical axis to a point projected on the optical axis from a most convex point of an image side surface 10 of the fifth lens 501.

The condition (2) defines a shape of the image side surface 10 of the fifth lens 501. Satisfying the condition (2) may help achieve a high optical performance according to the above condition.

The imaging lens 1000 may satisfy the following condition:

$$40.0° < \omega < 46.5° \quad (3)$$

wherein ω denotes a half view angle of the imaging lens 1000.

The condition (3) defines a view angle range of the imaging lens 1000, and thus a view angle larger than 80° can be achieved.

The imaging lens 1000 may satisfy the following condition:

$$-14 < R6 < 5 \quad (4)$$

wherein R6 denotes a curvature radius of an image side surface 6 of the third lens 301.

The condition (4) defines a shape of the image side surface 6 of the third lens 301. In some aspects, the condition (4), may permit the image side surface 6 of the third lens 301 to have a convex or concave shape.

The imaging lens 1000 may satisfy the following condition:

$$15 < V3 < 26 \quad (5)$$

wherein W3 denotes the Abbe number of the third lens 301.

The imaging lens 1000 may satisfy conditions below:

$$50 < V2 < 60 \quad (6)$$

$$50 < V4 < 60 \quad (7)$$

$$50 < V5 < 60 \quad (8)$$

wherein V2, V4, and V5 respectively denote the Abbe numbers of the second lens 201, the fourth lens 401, and the fifth lens 501.

The conditions (5) through (8) specify Abbe number ranges for the second lens 201 through the fifth lens 501. Satisfying these conditions may permit a chromatic aberration of the imaging lens 1000, (e.g., a longitudinal chromatic aberration on an axis and a magnification chromatic aberration on a non-axis), to be satisfactorily corrected.

A plastic material that satisfies the above conditions may be used for the second lens 201 through the fifth lens 501 in order to make the imaging lens 1000 light and more easily form an aspherical surface for aberration correction.

The imaging lens 1000 may satisfy the following condition:

$$0.5 < f2/f < 1.0 \quad (9)$$

wherein f2 denotes a focal length of the second lens 201, and f denotes the focal length of the imaging lens 1000.

The imaging lens 1000 may satisfy the following condition:

$$0.3 < f4/f < 1.0 \quad (10)$$

wherein f4 denotes a focal length of the fourth lens 401, and f denotes the focal length of the imaging lens 1000.

The imaging lens 1000 may satisfy the following condition:

$$-4.0 < f3/f < -1.0 \quad (11)$$

wherein f3 denotes a focal length of the third lens 301, and f denotes the focal length of the imaging lens 1000.

The imaging lens 1000 may satisfy the following condition:

$$-1.2 < f5/f < 0 \quad (12)$$

wherein f5 denotes a focal length of the fifth lens 501, and f denotes the focal length of the imaging lens 1000.

The conditions (9) through (12) are associated with allocations of refractive powers of the second lens 201 through the fifth lens 501. For example, the conditions may define a range of a ratio of a focal length of each lens to a total focal length of the imaging lens 1000. According to the above conditions, a refractive power of each lens may be appropriately set to satisfactorily perform aberration corrections, such as astigmatic field curves, etc., and achieve the full focal length within a desired range.

The imaging lens 1000 may satisfy the following condition:

$$1.8 < CT4/CT3 < 4.0 \quad (13)$$

wherein CT4 and CT3 respectively denote thicknesses of the fourth lens 401 and the third lens 301.

The first lens 101 through the fifth lens 501 appropriately use aspherical surfaces for aberration correction. For example, at least one surface of each of the first lens 101 through the fifth lens 501 may be an aspherical surface. Alternatively, both surfaces of each of the first lens 101 through the fifth lens 501 may be aspherical surfaces. In some implementations, the first lens 101 through the fifth lens 501 may be all implemented as double-sided aspherical lenses formed of plastic material(s). Therefore, aspherical lenses for aberration correction may be easily formed, and the imaging lens 1000 that is made light may be provided.

Hereinafter, detailed elements of several embodiments will be described along with lens data. In the lens data, ST refers to an aperture stop, f refers to a focal length, ω refers to a half view angle, F_number refers to F number, and TTL refers to an optical total length (e.g., a length from a surface of the imaging lens nearest to an object to an image plane). The measuring units of the focal length, optical total length, curvature radius, thickness, or air space are in mm.

an inverse number 1/R of a curvature radius at a peak of a lens.

FIG. 1 illustrates an optical arrangement of the imaging lens 1000 according to an embodiment.

The imaging lens 1000 includes the first lens 101, the second lens 201, the third lens 301, the fourth lens 401, and the fifth lens 501 that are sequentially arranged from the object OBJ to the image plane IMG (e.g., from the front end of the imaging lens to the rear end of the imaging lens). The first lens 101 has a negative refractive power, the second lens 201 has a positive refractive power, and the object side surface 3 of the second lens 201 has a convex shape. The third lens 301 has a negative refractive power, and has a meniscus shape in that the image side surface 6 of the third lens 301 is convex. The image side surface 8 of the fourth lens 401 has a convex shape, and the fourth lens 401 has a positive refractive power. The image side surface 8 of the fourth lens 401 has a shape having an inflection point, and the fifth lens 501 has a negative refractive power.

Lens data of the present embodiment is as follows.

F-number=2.25, ω=42.2°, f=2.47 mm

TABLE 1

| Surface | Curvature Radius | Thickness or Air Space | Refractive Index | Abbe Number |
|---|---|---|---|---|
| OBJ | infinity | 500 | | |
| 1 | 1.681 | 0.25 | 1.657 | 21.5 |
| 2 | 1.198 | 0.04 | | |
| 3 (ST) | 1.173 | 0.373 | 1.546 | 56 |
| 4 | −8.568 | 0.407 | | |
| 5 | −2.204 | 0.208 | 1.657 | 21.5 |
| 6 | −4.532 | 0.185 | | |
| 7 | −1.93 | 0.588 | 1.546 | 56 |
| 8 | −0.58 | 0.125 | | |
| 9 | 2.893 | 0.33 | 1.546 | 56 |
| 10 | 0.578 | 0.413 | | |
| 11 | infinity | 0.11 | 1.517 | 64.2 |
| 12 | infinity | 0.461 | | |
| IMG | infinity | −0.01 | | |

Aspherical coefficients are as follows.

TABLE 2

| | K | A | B | C | D | E | F |
|---|---|---|---|---|---|---|---|
| 1 | 0.0000.E+00 | −1.6358.E−01 | −7.7723.E−02 | 3.2059.E−02 | −2.9404.E−01 | 6.2968.E−01 | −3.0580.E−01 |
| 2 | −3.7953.E−01 | −3.2529.E−01 | 4.7059.E−02 | −5.1279.E−01 | 1.8271.E+00 | −8.6218.E−01 | −3.7688.E−02 |
| 3 | −1.8581.E+00 | −3.6169.E−02 | 1.0561.E−01 | −2.9407.E−01 | 8.5824.E−01 | −8.8557.E−01 | 3.7632.E−01 |
| 4 | 1.2831.E+02 | −6.6873.E−02 | −1.3973.E−01 | 4.3176.E−01 | −1.4816.E+00 | 5.0364.E−01 | 6.9723.E−01 |
| 5 | 6.5760.E+00 | −4.4684.E−01 | 6.8015.E−02 | −5.3913.E−01 | 5.0232.E−01 | 2.0585.E+00 | −2.9751.E+00 |
| 6 | 0.0000.E+00 | −3.4078.E−01 | 1.8310.E−01 | −2.5275.E−02 | −8.1226.E−03 | −1.8633.E−02 | 9.1507.E−02 |
| 7 | 0.0000.E+00 | −8.6989.E−02 | 6.9099.E−03 | −2.4873.E−01 | 1.9291.E−02 | −1.5887.E−02 | −1.7899.E−01 |
| 8 | −3.1250.E+00 | −3.1770.E−01 | 1.7329.E−01 | −7.5864.E−02 | 8.7591.E−03 | 3.4867.E−02 | 2.2326.E−02 |
| 9 | 0.0000.E+00 | −2.1837.E−01 | 5.5515.E−02 | 1.3873.E−02 | −9.8137.E−03 | 1.8583.E−03 | −1.2488.E−04 |
| 10 | −4.7588.E+00 | −1.1500.E−01 | 5.0381.E−02 | −1.6526.E−02 | 2.7879.E−03 | −1.4688.E−04 | −7.8952.E−06 |

Figure 2:
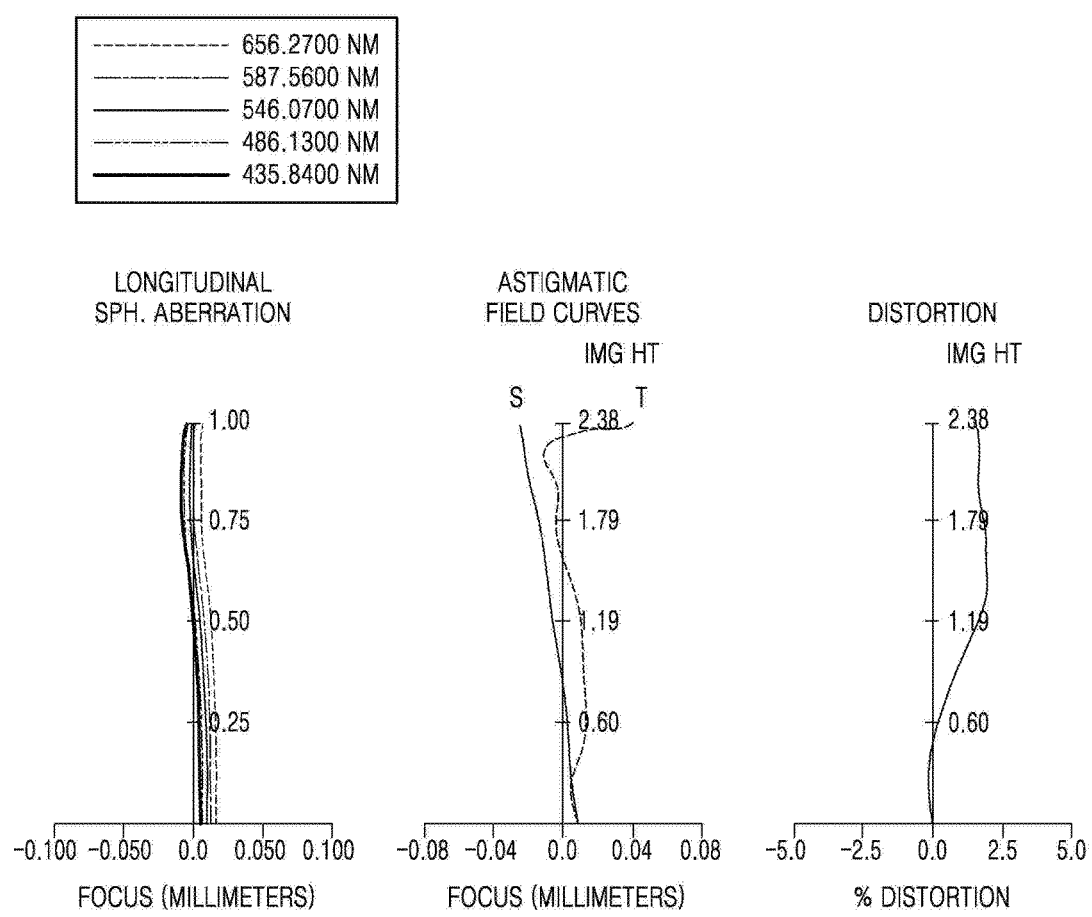
FIG. 2 shows graphs illustrating a longitudinal spherical aberration, astigmatic field curves, and a distortion of an example of an imaging lens, according to aspects of the disclosure.

An aspherical surface is defined as follows:

$$Z = \frac{cY^2}{1+\sqrt{1-(1+K)c^2Y^2}} + AY^4 + BY^6 CY^8 + DY^{10} + EY^{12} + FY^{14} + \ldots \quad (14)$$

wherein Z denotes a length from a vertex of a lens toward an optical axis, Y denotes a length in a vertical direction with respect to an optical axis, K denotes a conic constant, A, B, C, D, E, and F denote aspherical coefficients, and c denotes FIG. 2 shows graphs illustrating a longitudinal spherical aberration, astigmatic field curves, and a distortion of an example of the imaging lens of FIG. 1, according to aspects of the disclosure. The longitudinal spherical aberration respectively indicates light wavelengths of 656.2700 nm, 587.5600 nm, 546.0700 nm, 486.1300 nm, and 435.8400 nm. The astigmatic field curves and the distortion indicate light having a wavelength of 546.0700 nm. Also, on the graph of the astigmatic field curves, curves having a sagittal field curvature and a tangential field curvature are respectively denoted by S and T.

Figure 3:
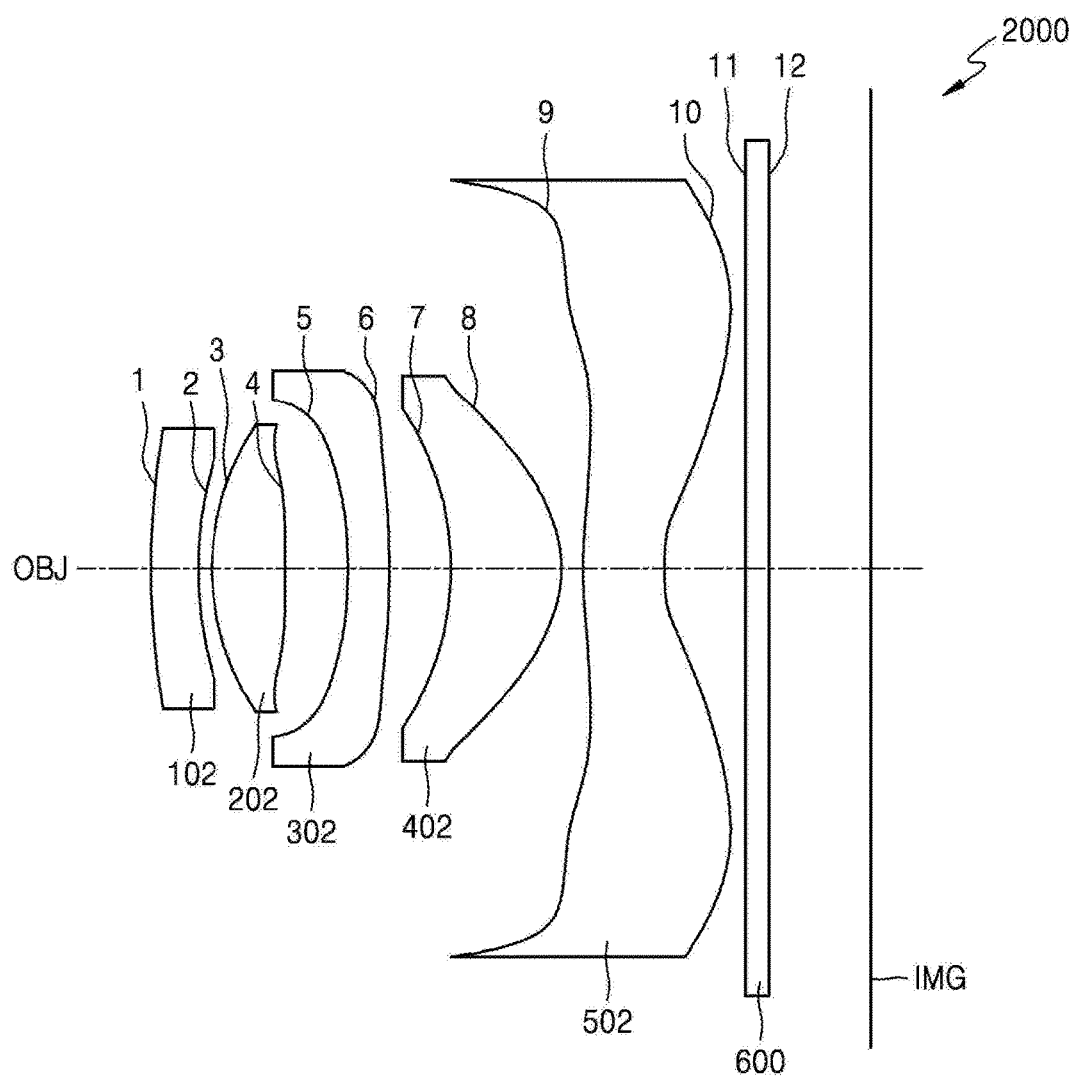
FIG. 3 is a diagram of an example of an imaging lens, according to aspects of the disclosure.

FIG. 3 is a diagram of an example of an imaging lens 2000, according to aspects of the disclosure.

The imaging lens 2000 includes a first lens 102, a second lens 202, a third lens 302, a fourth lens 402, and a fifth lens 502 that are sequentially arranged from an object OBJ to an image plane IMG (e.g., from the front end of the imaging lens to the rear end of the imaging lens). The first lens 102 has a negative refractive power, and the second lens 202 has a positive refractive power, and a surface 1 of the second lens 202 OBJ has a convex shape. The third lens 302 has a negative refractive power, and a surface 6 of the third lens 302 facing the image plane IMG has a convex meniscus shape. A surface 8 of the fourth lens 402 facing the image plane IMG has a convex shape, and the fourth lens 402 has a positive refractive power. A surface 10 of the fifth lens 502 facing the image plane IMG has a shape having an inflection point, and the fifth lens 502 has a negative refractive power.

Lens data of another embodiment is as follows.

TABLE 3

F-number = 2.24, ω = 42.8°, f = 2.40 mm

| Surface | Curvature Radius | Thickness or Air Space | Refractive Index | Abbe Number |
|---|---|---|---|---|
| OBJ | infinity | 500 | | |
| 1 | 2.595 | 0.23 | 1.657 | 21.5 |
| 2 | 1.825 | 0.055 | | |
| 3 (ST) | 1.31 | 0.367 | 1.546 | 56 |
| 4 | −6.081 | 0.297 | | |
| 5 | −2.961 | 0.2 | 1.657 | 21.5 |
| 6 | −10.189 | 0.292 | | |
| 7 | −1.841 | 0.541 | 1.537 | 56 |
| 8 | −0.588 | 0.105 | | |
| 9 | 3.098 | 0.385 | 1.537 | 56 |
| 10 | 0.601 | 0.402 | | |
| 11 | infinity | 0.11 | 1.517 | 64.2 |
| 12 | infinity | 0.478 | | |
| IMG | infinity | 0.009 | | |

Aspherical coefficients are as follows.

TABLE 4

| | K | A | B | C | D | E | F |
|---|---|---|---|---|---|---|---|
| 1 | 0.0000.E+00 | −1.4068.E−01 | −1.0320.E−01 | 6.0318.E−01 | −8.5935.E−01 | −1.0235.E−01 | 5.5747.E−01 |
| 2 | −8.2376.E−01 | −3.7833.E−01 | 6.3598.E−01 | −7.2634.E−02 | 7.3690.E−01 | −1.1369.E+00 | 1.1590.E−02 |
| 3 | −5.0278.E+00 | −8.2180.E−02 | 4.8019.E−01 | −6.2903.E−01 | 2.3974.E+00 | −1.2306.E+00 | 5.0067.E−01 |
| 4 | 0.0000.E+00 | −1.9022.E−01 | −5.5521.E−01 | 2.3819.E+00 | −3.0155.E+00 | 7.1127.E−01 | 5.5456.E+00 |
| 5 | 0.0000.E+00 | −5.6979.E−01 | 4.8572.E−01 | 6.1374.E−01 | 5.3532.E−01 | 1.2480.E−01 | −4.3042.E+00 |
| 6 | 0.0000.E+00 | −3.8257.E−01 | 5.9214.E−01 | 2.5875.E−01 | −5.2777.E−01 | −2.8650.E−01 | 1.3299.E−01 |
| 7 | 0.0000.E+00 | −1.2627.E−01 | 2.2834.E−02 | −6.9508.E−01 | 4.0022.E−01 | 1.9903.E−02 | −7.4806.E−01 |
| 8 | −3.1813.E+00 | −3.7667.E−01 | 2.4218.E−01 | −1.0753.E−01 | −2.5952.E−02 | 1.7640.E−01 | −2.1649.E−02 |
| 9 | 0.0000.E+00 | −2.3636.E−01 | 7.9395.E−02 | 5.2250.E−04 | −8.0850.E−03 | 3.2375.E−03 | −5.0868.E−04 |
| 10 | −4.9549.E+00 | −1.2380.E−01 | 5.5241.E−02 | −1.8499.E−02 | 2.8127.E−03 | −2.6292.E−05 | −2.5318.E−05 |

Figure 4:
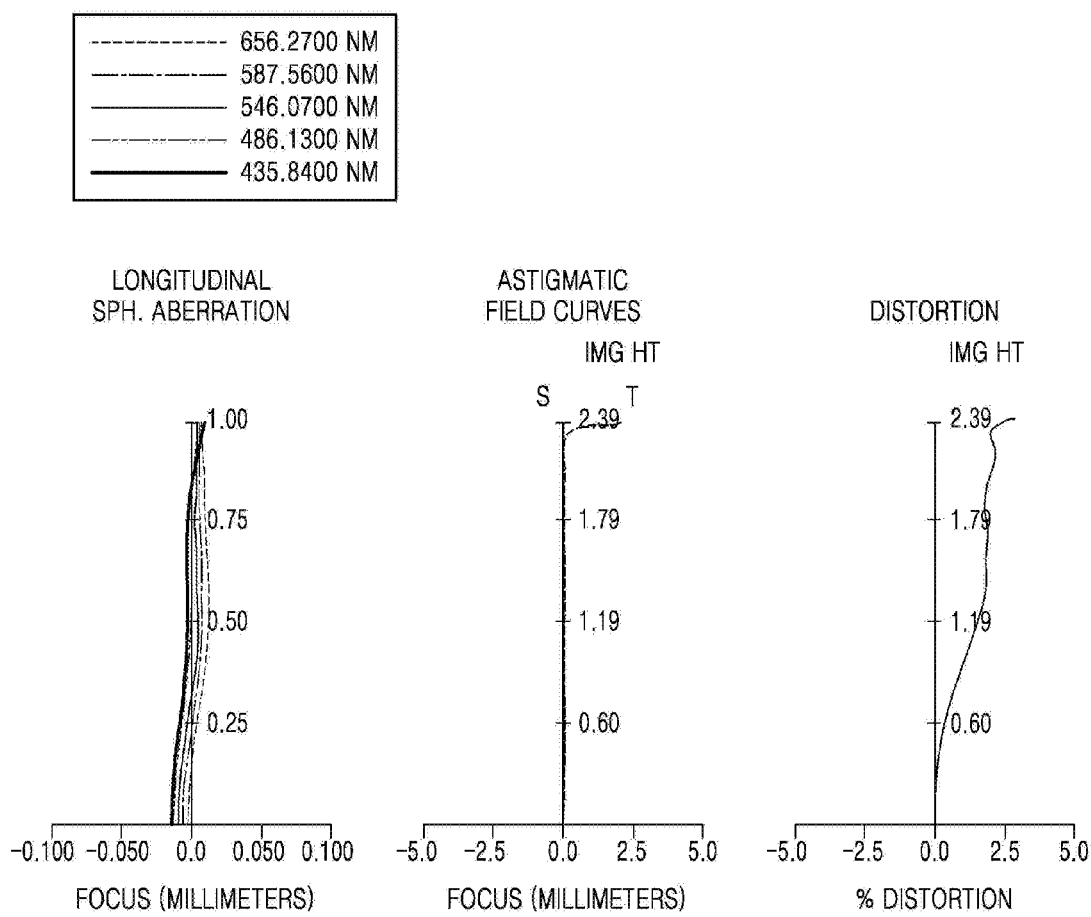
FIG. 4 shows graphs illustrating a longitudinal spherical aberration, astigmatic field curves, and a distortion of an example of an imaging lens, according to aspects of the disclosure.

FIG. 4 shows graphs illustrating a longitudinal spherical aberration, astigmatic field curves, and a distortion of an example of the imaging lens of FIG. 3, according to aspects of the disclosure.

Figure 5:
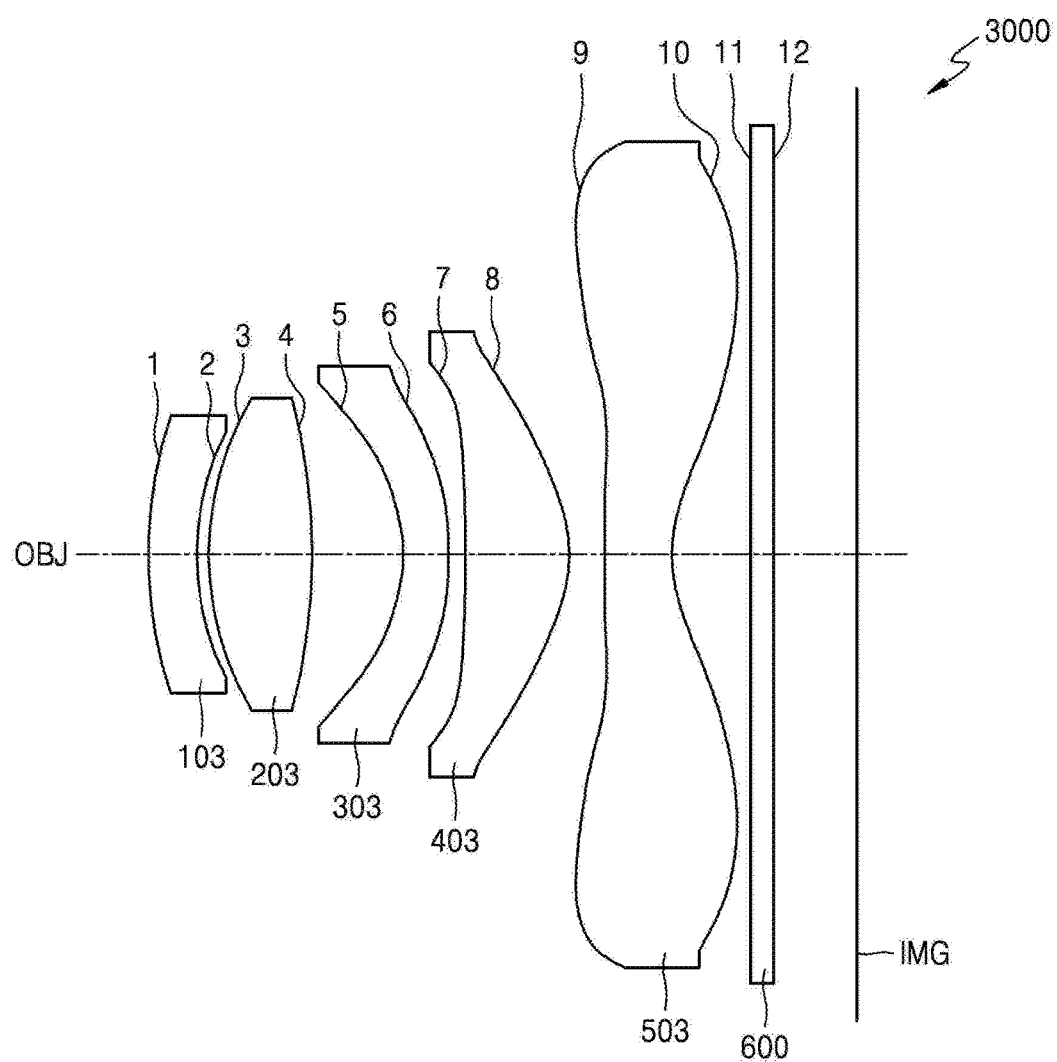
FIG. 5 is a diagram of an example of an imaging lens, according to aspects of the disclosure.

FIG. 5 is a diagram of an example of an imaging lens 3000, according to aspects of the disclosure.

The imaging lens 3000 includes a first lens 103, a second lens 203, a third lens 303, a fourth lens 403, and a fifth lens 503 that are sequentially arranged from an object OBJ to an image plane IMG (e.g., from the front end of the imaging lens to the rear end). The first lens 103 has a negative refractive power, and the second lens 203 has a positive refractive power, and an object side surface 3 of the second lens 203 has a convex shape. The third lens 303 has a negative refractive power, and has a meniscus shape in that the image side surface 6 of the third lens 303 is convex. An image side surface 8 of the fourth lens 403 has a convex shape, and the fourth lens 403 has a positive refractive power. An image side surface 10 of the fifth lens 503 has a shape having an inflection point, and the fifth lens 503 has a negative refractive power.

Lens data of another embodiment is as follows.

F-number=2.24, ω=42.2°, f=2.52 mm

TABLE 5

| Surface | Curvature Radius | Thickness or Air Space | Refractive Index | Abbe Number |
|---|---|---|---|---|
| OBJ | infinity | 500 | | |
| 1 (ST) | 1.531 | 0.251 | 1.657 | 21.5 |
| 2 | 1.12 | 0.049 | | |
| 3 | 1.24 | 0.52 | 1.546 | 56 |
| 4 | −4.692 | 0.436 | | |
| 5 | −1.011 | 0.22 | 1.657 | 21.5 |
| 6 | −1.857 | 0.084 | | |
| 7 | −37.617 | 0.514 | 1.546 | 56 |
| 8 | −0.731 | 0.169 | | |
| 9 | 5.264 | 0.334 | 1.546 | 56 |
| 10 | 0.648 | 0.392 | | |
| 11 | infinity | 0.11 | 1.517 | 64.2 |

TABLE 5-continued

| Surface | Curvature Radius | Thickness or Air Space | Refractive Index | Abbe Number |
|---|---|---|---|---|
| 12 | infinity | 0.412 | | |
| IMG | infinity | −0.008 | | |

Aspherical coefficients are as follows.

TABLE 6

| | K | A | B | C | D | E | F |
|---|---|---|---|---|---|---|---|
| 1 | −1.8118.E−01 | −1.9615.E−01 | 4.7127.E−02 | −1.9585.E−01 | −1.8129.E−02 | −9.1270.E−03 | 1.5339.E−02 |
| 2 | −6.1112.E−01 | −3.3873.E−01 | −5.3574.E−02 | 5.0273.E−01 | −1.1410.E+00 | 4.7505.E−01 | 1.5536.E−02 |
| 3 | −1.8850.E+00 | −6.9278.E−02 | 5.4219.E−02 | −1.4353.E−01 | 7.6777.E−01 | −1.4247.E+00 | 8.8105.E−01 |
| 4 | −2.2316.E+01 | −9.2330.E−02 | −4.9574.E−02 | −4.0310.E−02 | 3.3654.E−02 | −1.4196.E−02 | 2.4893.E−01 |
| 5 | −3.9591.E−01 | −1.8085.E−01 | 1.5816.E−01 | 2.3450.E−01 | 1.9706.E−01 | −1.4296.E−01 | 3.9474.E−02 |

TABLE 6-continued

| | K | A | B | C | D | E | F |
|---|---|---|---|---|---|---|---|
| 6 | 7.1497.E−01 | −2.9743.E−01 | 3.6499.E−01 | −1.8543.E−02 | −4.4403.E−02 | 1.9379.E−01 | −1.7701.E−01 |
| 7 | 0.0000.E+00 | −1.4888.E−01 | 1.1932.E−01 | −1.9331.E−01 | 3.7424.E−02 | 1.3280.E−01 | −1.2365.E−01 |
| 8 | −4.0364.E+00 | −1.6479.E−02 | 1.3050.E−02 | −7.2000.E−02 | 3.9137.E−02 | 1.8147.E−02 | −6.0805.E−03 |
| 9 | 5.0065.E+00 | −2.0488.E−01 | 5.7466.E−02 | 2.0509.E−02 | −1.3505.E−02 | 2.3269.E−03 | −1.1917.E−04 |
| 10 | −5.1485.E+00 | −1.3715.E−01 | 7.6787.E−02 | −2.9677.E−02 | 6.4260.E−03 | −6.7250.E−04 | 2.2474.E−05 |

Figure 6:
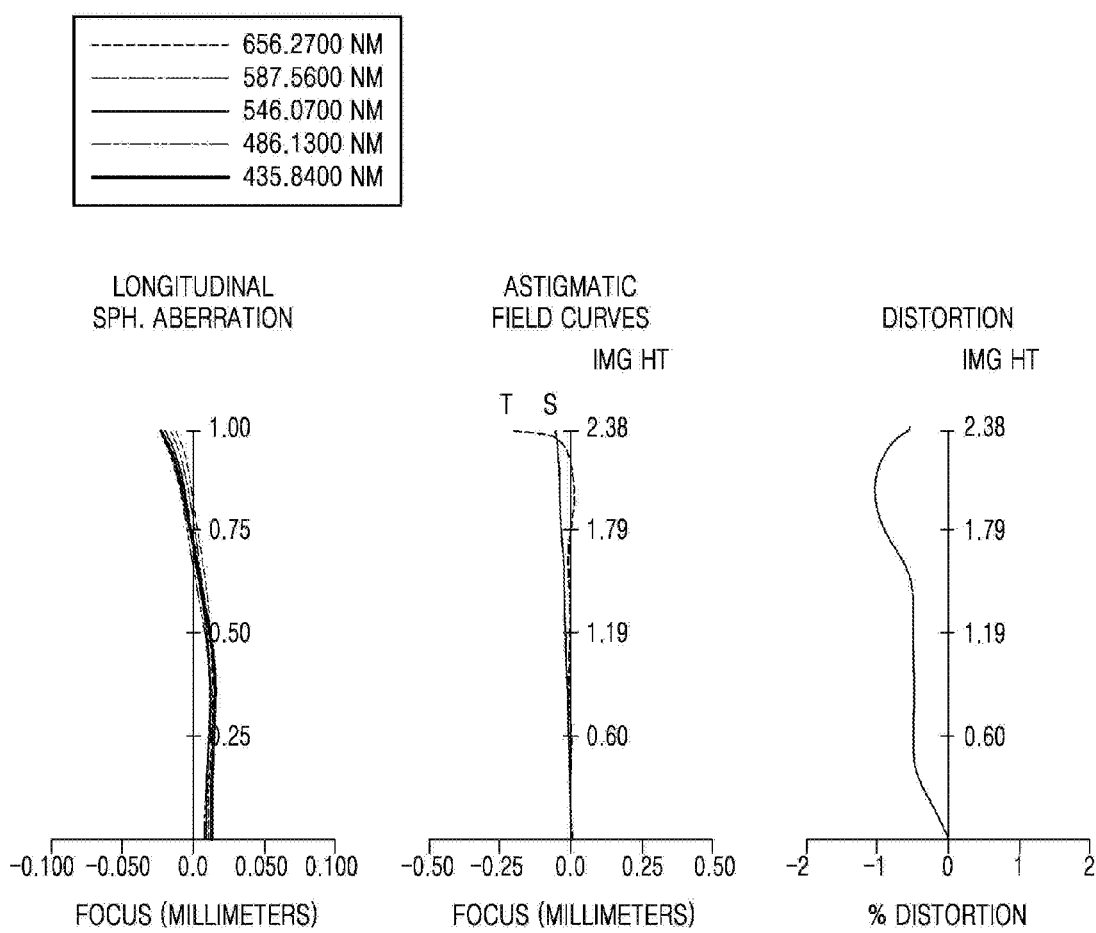
FIG. 6 shows graphs illustrating a longitudinal spherical aberration, astigmatic field curves, and a distortion of an example of an imaging lens, according to aspects of the disclosure.

FIG. 6 shows graphs illustrating a longitudinal spherical aberration, astigmatic field curves, and a distortion of an example of the imaging lens of FIG. 5, according to aspects of the disclosure.

Figure 7:
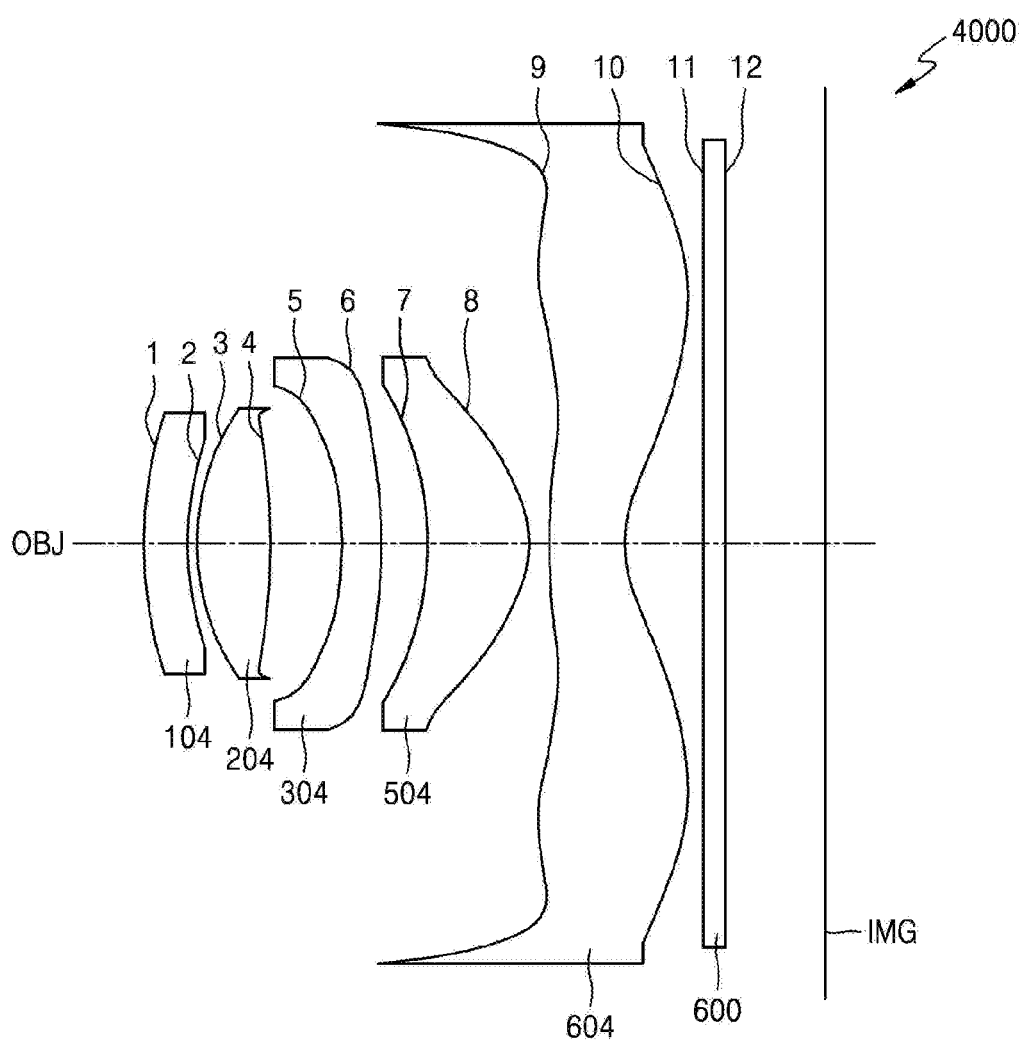
FIG. 7 is a diagram of an example of an imaging lens, according to aspects of the disclosure.

FIG. 7 is a diagram of an example of an imaging lens 4000, according to aspects of the disclosure.

The imaging lens 4000 includes a first lens 104, a second lens 204, a third lens 304, a fourth lens 404, and a fifth lens 504 that are sequentially arranged from an object OBJ to an image plane IMG (e.g., from the front end of the imaging lens to the rear end of the imaging lens). The first lens 104 has a negative refractive power, and the second lens 204 has a positive refractive power, and an object side surface 3 of the second lens 204 has a convex shape. The third lens 304 has a negative refractive power, and has a meniscus shape in that the image side surface 6 of the third lens 304 is convex. An image side surface 8 of the fourth lens 504 has a convex shape, and the fourth lens 504 has a positive refractive power. An image side surface of the fifth lens 504 has a shape having an inflection point, and the fifth lens 504 has a negative refractive power.

Lens data of another embodiment is as follows.

F-number=2.22, ω=42.7°, f=2.42 mm

TABLE 5

| Surface | Curvature Radius | Thickness or Air Space | Refractive Index | Abbe Number |
|---|---|---|---|---|
| OBJ | infinity | 500 | | |
| 1 | 2.01 | 0.21 | 1.657 | 21.5 |
| 2 | 1.502 | 0.055 | | |
| 3 (ST) | 1.351 | 0.372 | 1.546 | 56 |
| 4 | −6.677 | 0.363 | | |
| 5 | −2.27 | 0.202 | 1.657 | 21.5 |
| 6 | −4.631 | 0.231 | | |
| 7 | −1.839 | 0.527 | 1.537 | 56 |
| 8 | −0.615 | 0.106 | | |
| 9 | 2.642 | 0.392 | 1.537 | 56 |
| 10 | 0.622 | 0.402 | | |
| 11 | infinity | 0.11 | 1.517 | 64.2 |
| 12 | infinity | 0.508 | | |
| IMG | infinity | 0.007 | | |

Aspherical coefficients are as follows.

Figure 8:
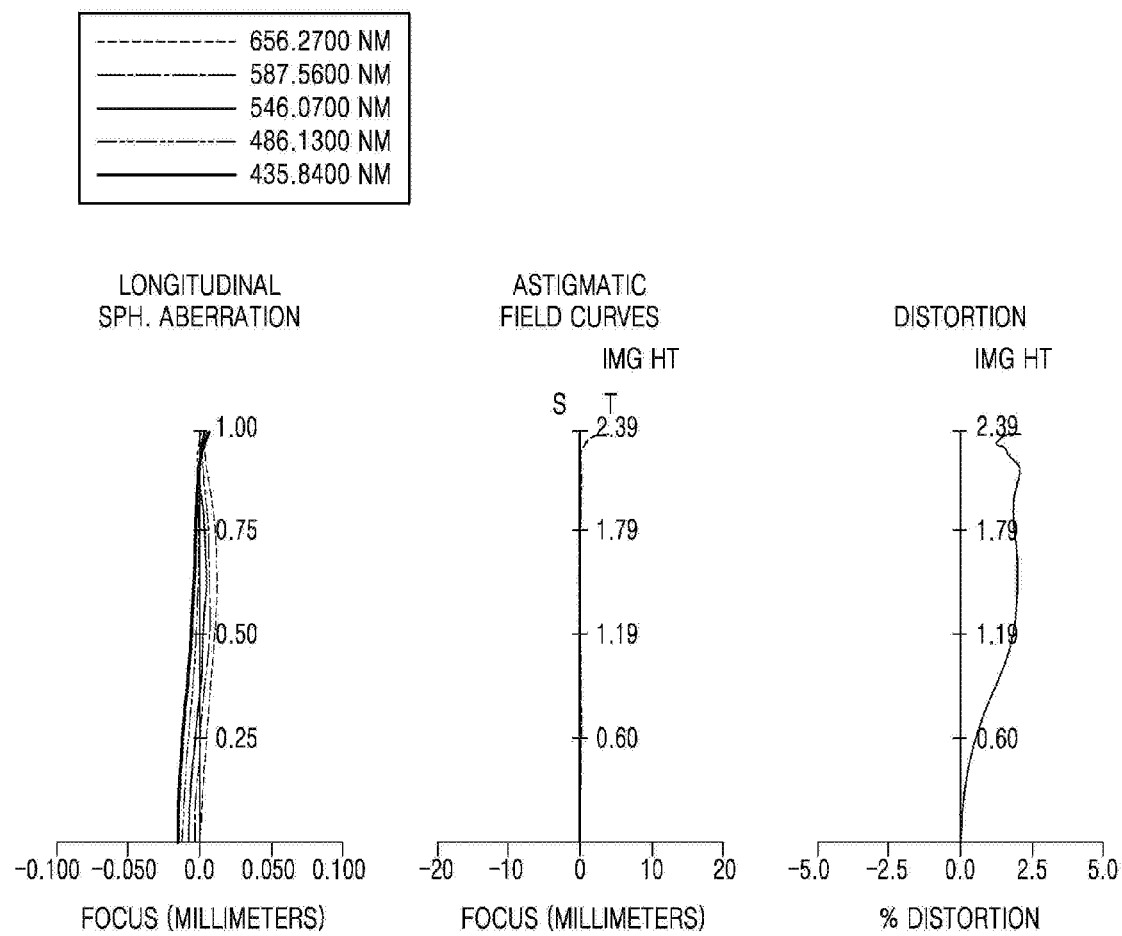
FIG. 8 shows graphs illustrating a longitudinal spherical aberration, astigmatic field curves, and a distortion of an example of an imaging lens, according to aspects of the disclosure.

FIG. 8 shows graphs illustrating a longitudinal spherical aberration, astigmatic field curves, and a distortion of an example of the imaging lens of FIG. 7, according to aspects of the disclosure.

Figure 9:
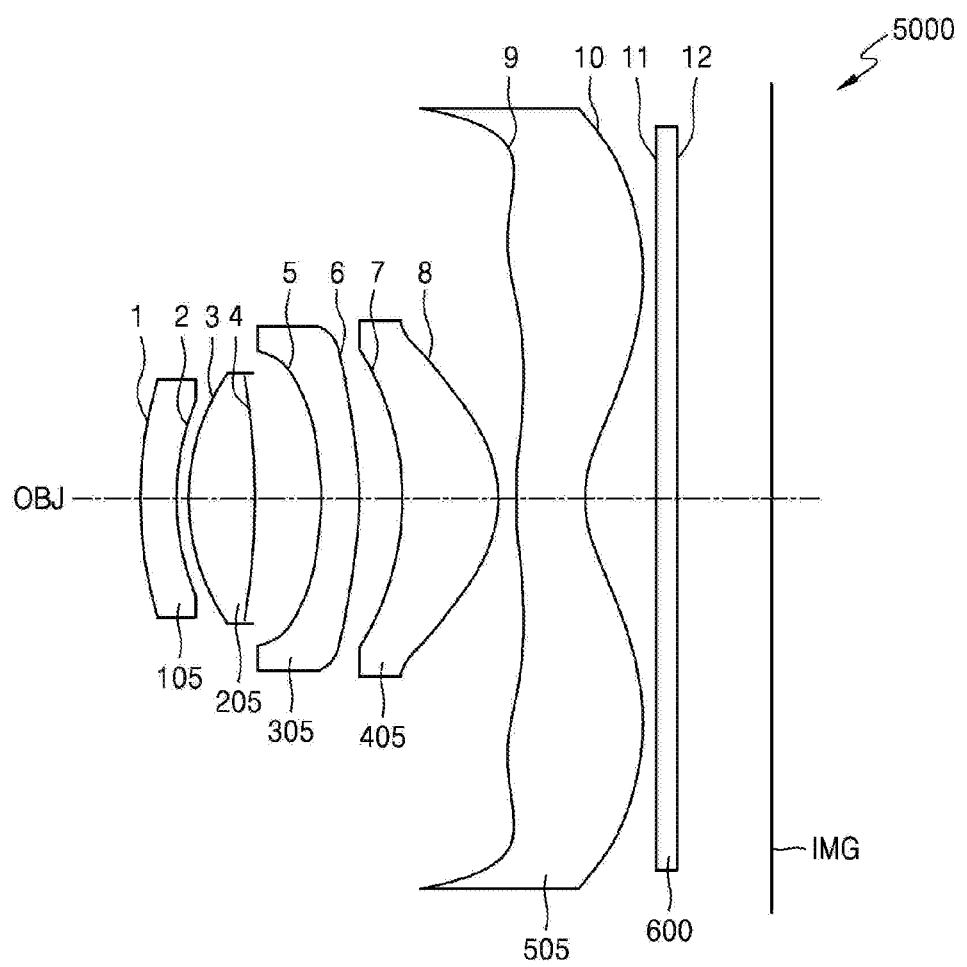
FIG. 9 is a diagram of an example of an imaging lens, according to aspects of the disclosure.

FIG. 9 is a diagram of an example of an imaging lens 5000, according to aspects of the disclosure.

The imaging lens 5000 includes a first lens 105, a second lens 205, a third lens 305, a fourth lens 405, and a fifth lens 505 that are sequentially arranged from an object OBJ to an image plane IMG (e.g., from the front end of the imaging lens to the rear end of the imaging lens). The first lens 105 has a negative refractive power, and the second lens 205 has a positive refractive power, and an object side surface 3 of the second lens 205 has a convex shape. The third lens 305 has a negative refractive power, and has a meniscus shape in that the image side surface 6 of the third lens 305 is convex. An image side surface 8 of the fourth lens 405 has a convex shape, and the fourth lens 405 has a positive refractive power. An image side surface 10 of the fifth lens 505 has a shape having an inflection point, and the fifth lens 505 has a negative refractive power.

Lens data of another embodiment is as follows.

F-number=2.26, ω=42.4°, f=2.47 mm

| Surface | Curvature Radius | Thickness or Air Space | Refractive Index | Abbe Number |
|---|---|---|---|---|
| OBJ | infinity | 500 | | |
| 1 | 1.779 | 0.2 | 1.657 | 21.5 |
| 2 | 1.387 | 0.06 | | |
| 3 (ST) | 1.372 | 0.365 | 1.546 | 56 |
| 4 | −6.881 | 0.37 | | |
| 5 | −2.331 | 0.204 | 1.657 | 21.5 |
| 6 | −4.877 | 0.246 | | |
| 7 | −1.968 | 0.528 | 1.537 | 56 |
| 8 | −0.616 | 0.106 | | |

TABLE 8

| | K | A | B | C | D | E | F |
|---|---|---|---|---|---|---|---|
| 1 | 0.0000.E+00 | −1.6829.E−01 | 1.2645.E−02 | 2.7072.E−01 | −5.8916.E−01 | −9.1162.E−02 | 5.7645.E−01 |
| 2 | 2.5278.E−02 | −3.4405.E−01 | 3.2026.E−01 | 5.4025.E−01 | 1.7076.E−01 | −1.1453.E+00 | −1.3426.E−02 |
| 3 | −3.5603.E+00 | −8.6320.E−02 | 2.6824.E−01 | 6.5502.E−02 | 1.4434.E+00 | −1.2201.E+00 | 5.0044.E−01 |
| 4 | 9.8075.E+01 | −1.4686.E−01 | −3.2591.E−02 | 3.8681.E−01 | −3.1142.E−01 | 7.0247.E−01 | 5.5554.E+00 |
| 5 | 2.7535.E+00 | −4.3062.E−01 | 1.8605.E−01 | 3.8082.E−01 | 1.4958.E+00 | 1.2933.E+00 | 4.2927.E+00 |
| 6 | 0.0000.E+00 | −2.9717.E−01 | 3.5446.E−01 | 8.5011.E−02 | 7.7787.E−03 | −2.6934.E−02 | −3.3028.E−01 |
| 7 | 0.0000.E+00 | −2.0989.E−02 | 5.6829.E−02 | −1.2732.E−02 | 5.0583.E−02 | −4.3455.E−02 | −2.0581.E−01 |
| 8 | −3.2054.E+00 | −3.2569.E−01 | 2.3047.E−01 | −4.5659.E−02 | 1.6141.E−02 | 3.4171.E−02 | 9.7601.E−03 |
| 9 | 0.0000.E+00 | −2.5308.E−01 | 6.8360.E−02 | 1.6609.E−02 | −1.2063.E−02 | 2.4083.E−03 | −1.8735.E−04 |
| 10 | −4.8299.E+00 | −1.2492.E−01 | 5.2751.E−02 | −1.7313.E−02 | 3.2835.E−03 | −3.0418.E−04 | 1.1973.E−05 |

-continued

| Surface | Curvature Radius | Thickness or Air Space | Refractive Index | Abbe Number |
|---|---|---|---|---|
| 9 | 2.776 | 0.376 | 1.537 | 56 |
| 10 | 0.61 | 0.402 | | |
| 11 | infinity | 0.11 | 1.517 | 64.2 |
| 12 | infinity | 0.511 | | |
| IMG | infinity | 0.007 | | |

Aspherical coefficients are as follows.

TABLE 10

| | K | A | B | C | D | E | F |
|---|---|---|---|---|---|---|---|
| 1 | 0.0000.E+00 | −1.8926.E−01 | 2.1813.E−02 | 2.5332.E−01 | −6.8192.E−01 | −6.2199.E−02 | 6.5162.E−01 |
| 2 | 8.3014.E−02 | −3.3631.E−01 | 2.9609.E−01 | 4.6894.E−01 | 1.7744.E−01 | −1.1698.E+00 | −5.4053.E−02 |
| 3 | −3.0086.E+00 | −7.4914.E−02 | 2.5809.E−01 | 6.3074.E−02 | 1.4718.E+00 | −1.2016.E+00 | 5.3973.E−01 |
| 4 | 9.6478.E+01 | −1.5791.E−01 | 1.6731.E−03 | 3.3706.E−01 | −4.5580.E−01 | 6.8335.E−01 | 5.5084.E+00 |
| 5 | 2.8265.E+00 | −4.3018.E−01 | 1.8076.E−01 | 3.7499.E−01 | 1.4574.E+00 | 1.3767.E−01 | −4.2671.E+00 |
| 6 | 0.0000.E+00 | −3.1534.E−01 | 3.5149.E−01 | 8.5389.E−02 | 4.5155.E−02 | −2.6552.E−02 | −2.8787.E−01 |
| 7 | 0.0000.E+00 | −4.9908.E−02 | 3.1919.E−02 | 8.7418.E−03 | 4.0503.E−02 | −5.6329.E−02 | −1.9397.E−01 |
| 8 | −3.3460.E+00 | −3.2173.E−01 | 2.3552.E−01 | −5.7204.E−02 | 1.0834.E−02 | 2.8603.E−02 | 6.4164.E−03 |
| 9 | 0.0000.E+00 | −2.5009.E−01 | 7.0033.E−02 | 1.7568.E−02 | −1.3011.E−02 | 2.5565.E−03 | −1.8459.E−04 |
| 10 | −4.8731.E+00 | −1.2435.E−01 | 5.3068.E−02 | −1.7331.E−02 | 3.1496.E−03 | −2.3122.E−04 | 6.7012.E−07 |

Figure 10:
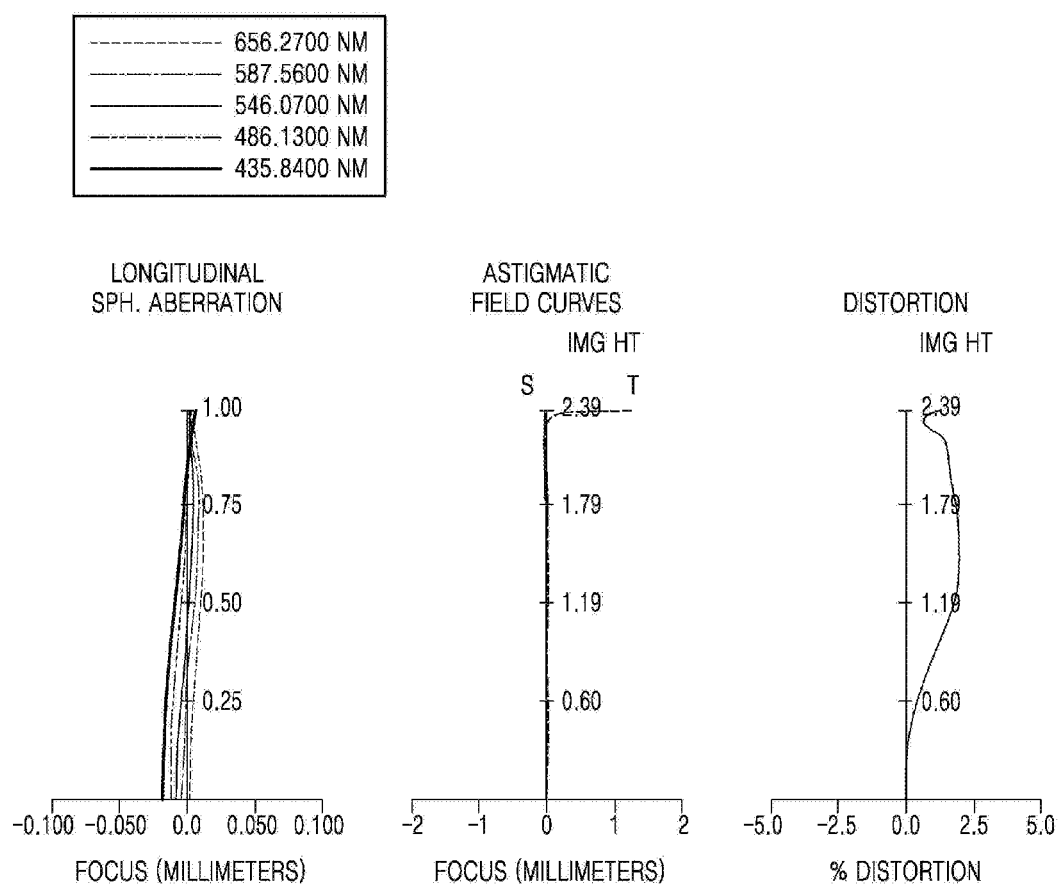
FIG. 10 shows graphs illustrating a longitudinal spherical aberration, astigmatic field curves, and a distortion of an example of an imaging lens, according to aspects of the disclosure.

FIG. 10 shows graphs illustrating a longitudinal spherical aberration, astigmatic field curves, and a distortion of an example of the imaging lens of FIG. 9, according to aspects of the disclosure.

Figure 11:
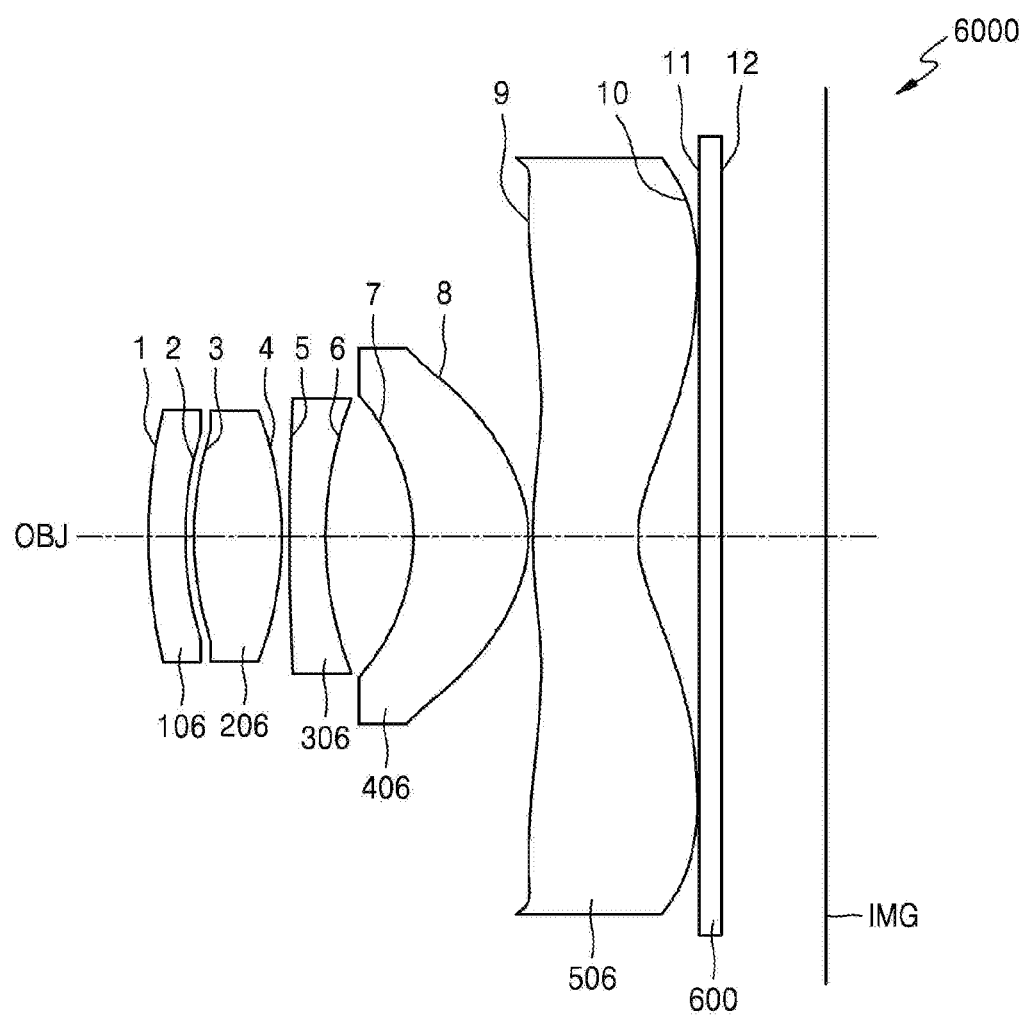
FIG. 11 is a diagram of an example of an imaging lens, according to aspects of the disclosure.

FIG. 11 is a diagram of an example of an imaging lens 6000, according to aspects of the disclosure.

The imaging lens 6000 includes a first lens 106, a second lens 206, a third lens 306, a fourth lens 406, and a fifth lens 506 that are sequentially arranged from an object OBJ to an image plane IMG (e.g., from the front end of the imaging lens to the rear end of the imaging lens). The first lens 106 has a negative refractive power, and the second lens 206 has a positive refractive power, and an object side surface 3 of the second lens 206 has a convex shape. The third lens 306 has a negative refractive power, and has a meniscus shape in that the image side surface 6 of the third lens 306 is concave. An image side surface 8 of the fourth lens 406 has a convex shape, and the fourth lens 406 has a positive refractive power. An image side surface 10 of the fifth lens 506 has a shape having an inflection point, and the fifth lens 506 has a negative refractive power.

Lens data of another embodiment is as follows.
F-number=2.155, ω=42.7°, f=2.37 m

TABLE 11

| Surface | Curvature Radius | Thickness or Air Space | Refractive Index | Abbe Number |
|---|---|---|---|---|
| OBJ | infinity | 800 | | |
| 1 | 1.637 | 0.19 | 1.547 | 56 |
| 2 | 1.124 | 0.039 | | |
| 3 (ST) | 1.124 | 0.452 | 1.547 | 56 |
| 4 | −2.618 | 0.028 | | |
| 5 | 10.356 | 0.19 | 1.658 | 21.5 |
| 6 | 2.232 | 0.447 | | |

TABLE 11-continued

| Surface | Curvature Radius | Thickness or Air Space | Refractive Index | Abbe Number |
|---|---|---|---|---|
| 7 | −1.33 | 0.58 | 1.547 | 56 |
| 8 | −0.729 | 0.029 | | |
| 9 | 2.165 | 0.537 | 1.538 | 56 |
| 10 | 0.736 | 0.313 | | |
| 11 | infinity | 0.11 | 1.519 | 64.2 |
| 12 | infinity | 0.517 | | |
| IMG | infinity | 0 | | |

Aspherical coefficients are as follows.

TABLE 12

| | K | A | B | C | D | E | F | G | H | J |
|---|---|---|---|---|---|---|---|---|---|---|
| 1 | −1.368E+01 | −2.435E−02 | 1.340E−01 | −1.029E+00 | 1.353E+00 | −1.775E−01 | −9.241E−01 | −8.149E−01 | −3.007E−01 | −1.618E−02 |
| 2 | −1.044E+01 | −4.531E−01 | 8.362E−01 | −5.434E−01 | 1.506E+00 | −1.019E+01 | 9.338E+00 | −3.561E+00 | −1.543E−01 | 0.000E+00 |
| 3 | −1.095E+01 | −1.491E−01 | 2.231E−02 | 9.055E−01 | 7.624E−01 | −1.508E+01 | 1.381E+01 | −6.427E+00 | −1.114E−01 | 0.000E+00 |
| 4 | −4.969E+01 | −4.837E−01 | 8.958E−01 | −3.283E+00 | 1.064E+01 | −2.483E+01 | 2.358E+01 | −9.257E+00 | 1.151E−01 | 0.000E+00 |
| 5 | 0.000E+00 | 0.000E+00 | 0.000E+00 | 0.000E+00 | 0.000E+00 | 0.000E+00 | 0.000E+00 | 0.000E+00 | 0.000E+00 | 0.000E+00 |
| 6 | −3.545E+00 | 1.911E−01 | −2.681E−01 | 4.608E−02 | 6.721E−01 | 4.430E−01 | −2.708E+00 | 1.995E+00 | 1.826E−02 | 0.000E+00 |
| 7 | 1.678E+00 | 1.023E−01 | −4.191E−01 | 4.541E−01 | −3.974E−01 | 5.950E−01 | −6.053E−01 | −2.036E−01 | −4.602E−02 | 1.726E+00 |
| 8 | −4.854E−01 | 3.523E−01 | −4.394E−01 | 5.649E−01 | −1.803E−01 | −1.067E−01 | 7.227E−02 | 8.195E−02 | 7.719E−02 | 8.444E−02 |
| 9 | −1.182E−01 | −4.438E−01 | 3.672E−01 | −2.037E−01 | 8.109E−02 | −2.211E−02 | 3.339E−03 | −1.242E−04 | −1.432E−05 | −1.046E−06 |
| 10 | −4.476E+00 | −1.804E−01 | 1.325E−01 | −7.006E−02 | 2.305E−02 | −4.406E−03 | 4.388E−04 | −2.905E−05 | 3.689E−06 | −2.661E−07 |

Figure 12:
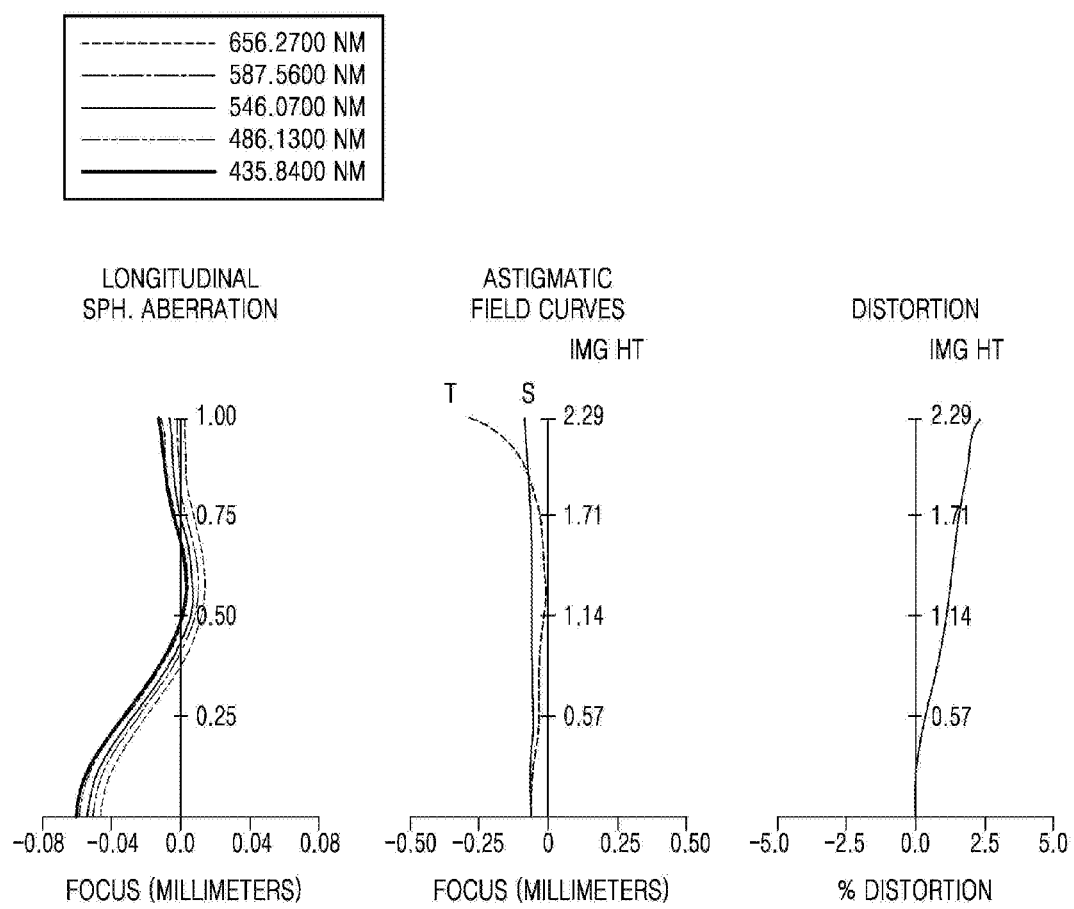
FIG. 12 shows graphs illustrating a longitudinal spherical aberration, astigmatic field curves, and a distortion of an example of an imaging lens, according to aspects of the disclosure.

FIG. 12 shows graphs illustrating a longitudinal spherical aberration, astigmatic field curves, and a distortion of an example of the imaging lens of FIG. 11, according to aspects of the disclosure.

Figure 13:
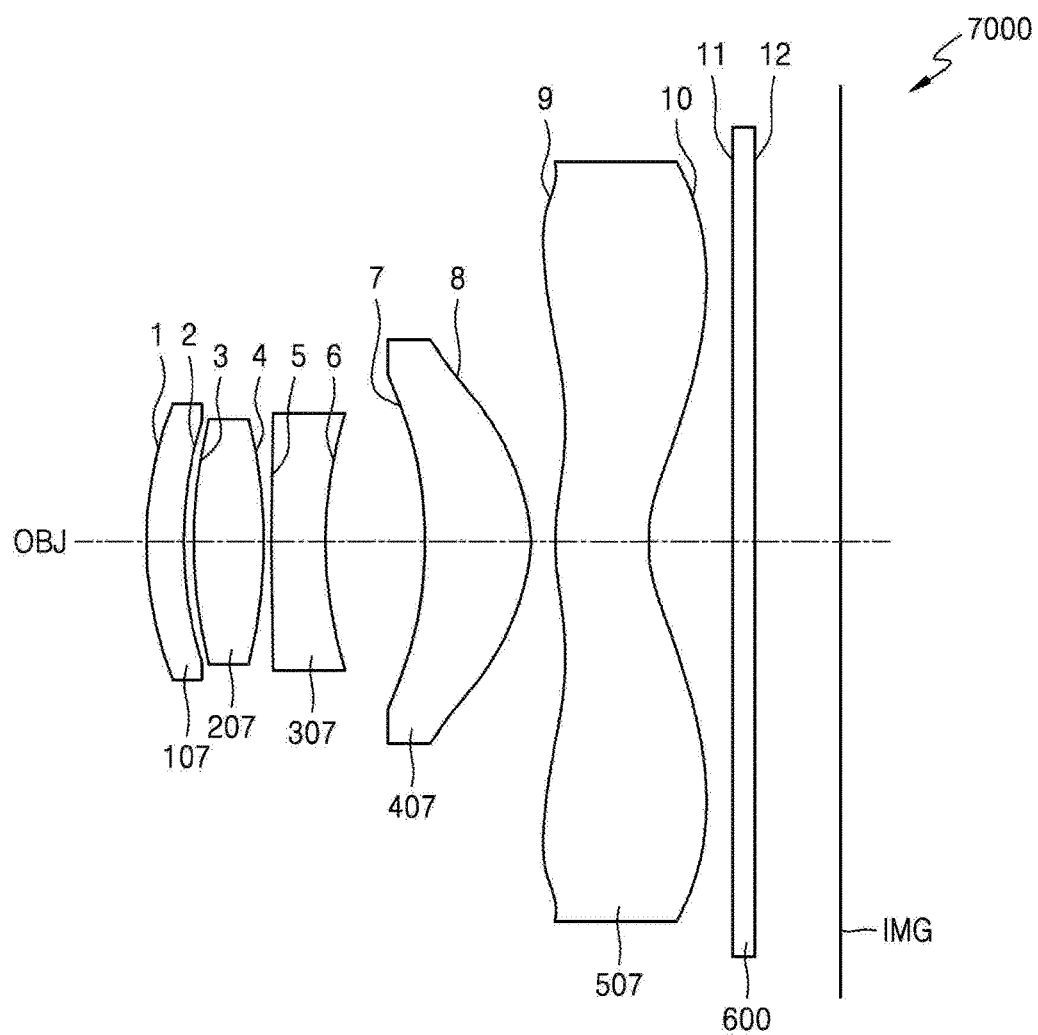
FIG. 13 is a diagram of an example of an imaging lens, according to aspects of the disclosure.

FIG. 13 is a diagram of an example of an imaging lens 7000, according to aspects of the disclosure.

The imaging lens 7000 includes a first lens 107, a second lens 207, a third lens 307, a fourth lens 407, and a fifth lens 507 that are sequentially arranged from an object OBJ to an image plane IMG (e.g., from the front end of the imaging lens to the rear end of the imaging lens). The first lens 107 has a negative refractive power, and the second lens 207 has a positive refractive power, and an object side surface 3 of the second lens 207 has a convex shape. The third lens 307 has a negative refractive power, and has a meniscus shape in that the image side surface 6 of the third lens 307 is concave. A surface 8 of the fourth lens 407 facing the image plane IMG has a convex shape, and the fourth lens 407 has a positive refractive power. A surface 10 of the fifth lens 507 facing the image plane IMG has a shape having an inflection point, and the fifth lens 507 has a negative refractive power.

Lens data of another embodiment is as follows.

F-number=2.14, ω=41.0°, f=2.54 m

TABLE 13

| Surface | Curvature Radius | Thickness or Air Space | Refractive Index | Abbe Number |
|---|---|---|---|---|
| OBJ | infinity | 500 | | |
| 1 | 1.544 | 0.19 | 1.547 | 56 |

TABLE 13-continued

| Surface | Curvature Radius | Thickness or Air Space | Refractive Index | Abbe Number |
|---|---|---|---|---|
| 2 | 1.434 | 0.048 | | |
| 3 (ST) | 1.526 | 0.347 | 1.547 | 56 |
| 4 | −6.179 | 0.042 | | |
| 5 | 8.42 | 0.275 | 1.658 | 21.5 |
| 6 | 2.532 | 0.491 | | |
| 7 | −2.238 | 0.528 | 1.547 | 56 |
| 8 | −0.889 | 0.134 | | |
| 9 | 1.838 | 0.463 | 1.538 | 56 |
| 10 | 0.731 | 0.418 | | |
| 11 | infinity | 0.11 | 1.519 | 64.2 |
| 12 | infinity | 0.411 | | |
| IMG | infinity | 0.02 | | |

Aspherical coefficients are as follows.

TABLE 14

| | K | A | B | C | D | E | F | G | H | J |
|---|---|---|---|---|---|---|---|---|---|---|
| 1 | −8.108E+00 | 2.480E−02 | 1.140E−01 | −8.245E−01 | 1.722E+00 | −1.183E+00 | 4.579E−01 | −9.526E−01 | −3.640E−01 | 1.155E−08 |
| 2 | −1.438E+01 | −2.415E−01 | 6.029E−01 | −1.191E+00 | 3.792E+00 | −7.245E+00 | 1.063E+01 | −4.112E+00 | −1.828E−01 | 0.000E+00 |
| 3 | −1.781E+01 | −1.073E−01 | 2.316E−01 | −4.901E−01 | 1.535E+00 | −7.638E+00 | 1.572E+01 | −7.372E+00 | −1.319E−01 | 0.000E+00 |
| 4 | −2.745E+01 | −2.034E−01 | 4.837E−01 | −6.133E+00 | 2.033E+01 | −3.178E+01 | 2.604E+01 | −1.074E+01 | 1.787E−01 | 0.000E+00 |
| 5 | 9.528E+01 | −5.836E−02 | 4.141E−01 | −6.660E+00 | 2.298E+01 | −3.415E+01 | 2.864E+01 | −1.394E+01 | −1.106E−01 | 0.000E+00 |
| 6 | 4.653E+00 | 9.485E−02 | −2.672E−01 | −5.952E−01 | 1.462E+00 | 1.949E+00 | −5.892E+00 | 3.536E+00 | 2.419E−02 | 0.000E+00 |
| 7 | 2.455E+00 | 1.758E−01 | −5.970E−01 | 9.888E−01 | −8.136E−01 | 6.840E−02 | −2.420E−02 | 1.511E−01 | 3.301E−01 | −4.377E−01 |
| 8 | −4.818E−01 | 2.256E−01 | −2.677E−01 | 3.292E−01 | −8.714E−02 | −5.897E−02 | 5.463E−02 | 3.848E−02 | 8.691E−03 | −2.791E−02 |
| 9 | −6.073E+00 | −4.663E−01 | 4.009E−01 | −2.141E−01 | 8.811E−02 | −2.492E−02 | 3.718E−03 | −1.385E−04 | −8.579E−06 | −1.794E−06 |
| 10 | −4.147E+00 | −2.074E−01 | 1.470E−01 | −7.329E−02 | 2.285E−02 | −4.507E−03 | 5.826E−04 | −4.204E−05 | −1.015E−06 | 3.881E−07 |

Figure 14:
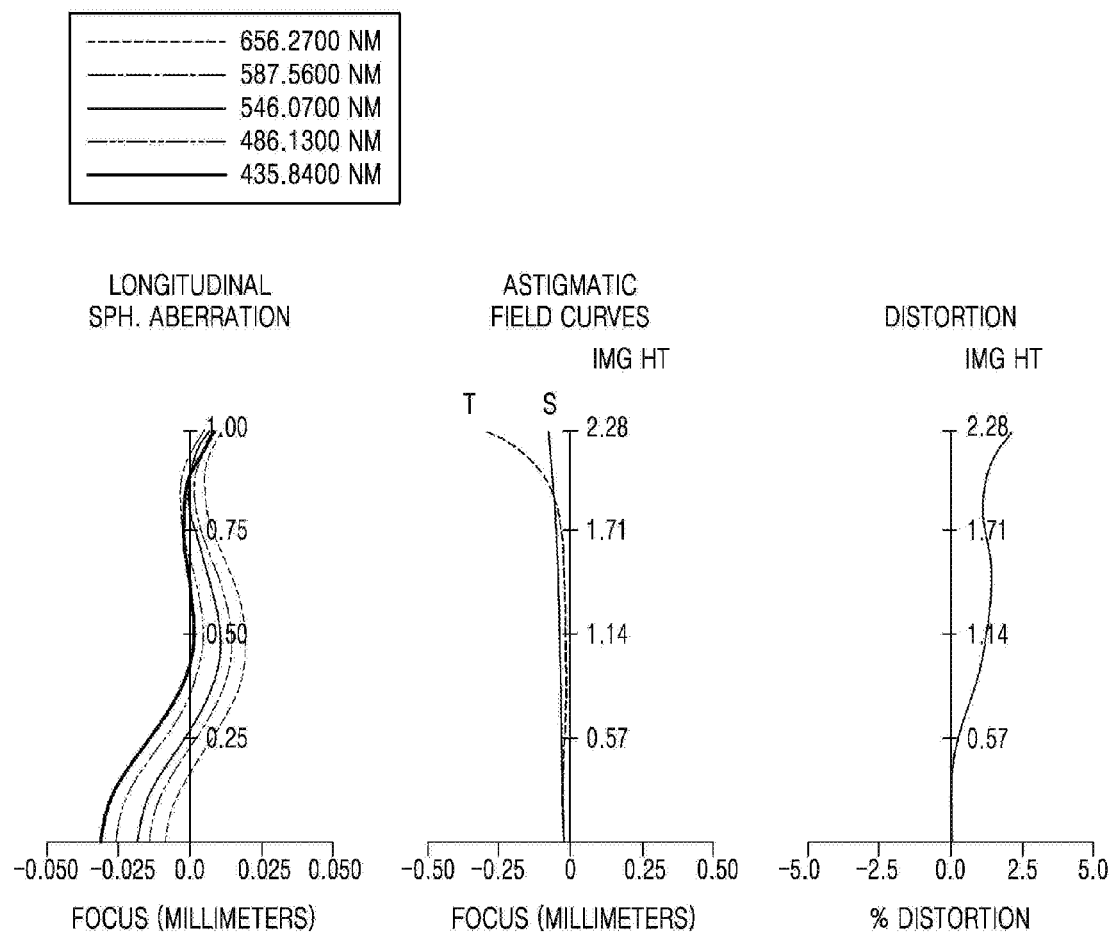
FIG. 14 is shows graphs illustrating a longitudinal spherical aberration, astigmatic field curves, and a distortion of an example of an imaging lens, according to aspects of the disclosure.

FIG. 14 shows graphs illustrating a longitudinal spherical aberration, astigmatic field curves, and a distortion of an example of the imaging lens of FIG. 13, according to aspects of the disclosure.

Table 15 below shows various optical specifications, such as focal lengths f, half view angles ω, focal lengths f1, f2, f3, f4, and f5, and optical total lengths TTL of respective lenses of imaging lenses according to various embodiments, and aberrations associated with the above conditions.

TABLE 15

| | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment |
|---|---|---|---|---|---|---|---|
| f | 2.47 | 2.4 | 2.52 | 2.42 | 2.47 | 2.37 | 2.54 |
| f1 | −7.99 | −10.61 | −8.38 | −10.82 | −11.99 | −7.54 | −98.78 |
| f2 | 1.91 | 2.01 | 1.85 | 2.09 | 2.13 | 1.5 | 2.27 |
| f3 | −6.77 | −6.42 | −3.76 | −7.01 | −7.02 | −4.36 | −5.61 |
| f4 | 1.32 | 1.4 | 1.36 | 1.47 | 1.44 | 2.2 | 2.37 |
| f5 | −1.39 | −1.47 | −1.39 | −1.6 | −1.53 | −2.39 | −2.64 |
| ω | 42.2 | 42.8 | 42.3 | 42.7 | 42.4 | 42.7 | 41 |
| TTL | 3.48 | 3.47 | 3.48 | 3.48 | 3.48 | 3.43 | 3.48 |
| f2/f | 0.77 | 0.84 | 0.73 | 0.86 | 0.86 | 0.63 | 0.89 |
| f3/f | −2.74 | −2.68 | −1.49 | −2.9 | −2.84 | −1.84 | −2.21 |
| f4/f | 0.53 | 0.58 | 0.54 | 0.61 | 0.58 | 0.93 | 0.93 |
| f5/f | −0.56 | −0.61 | −0.55 | −0.66 | −0.62 | −1.01 | −1.04 |
| CT4/CT3 | 2.83 | 2.71 | 2.34 | 2.61 | 2.59 | 3.05 | 1.92 |
| $D_{p5s2i} - D_{p5s2m}$ | 0.62 | 0.68 | 0.59 | 0.71 | 0.71 | 0.64 | 0.67 |

The above-described embodiments show wide angles, short full lengths, and high optical performances.

An imaging lens as described above may adjust a shape of a lens surface of each lens and set arrangements and focal lengths between lenses to form a high-resolution image having various types of reduced aberrations.

Additionally or alternatively, in some implementations, the imaging lens may use five plastic lenses in order to achieve reductions in weight and cost.

Additionally or alternatively, in some implementations, the imaging lens may be a small wide-angle lens suitable for use in a subminiature optical device that is part of a mobile device.

The above-described embodiments may be applied to an image sensor that converts an optical image formed through an imaging lens as described above into an electrical signal and to various types of imaging apparatuses, e.g., to a digital camera, a surveillance camera, a smartphone, etc. Also, an imaging apparatus may be installed in a thin film type electronic device, e.g., a mobile communication device or the like.

FIGS. 1-14 are provided as an example only. It will be understood that the provision of the examples described herein, as well as clauses phrased as "such as," "e.g.", "including", "in some aspects," "in some implementations," and the like should not be interpreted as limiting the claimed subject matter to the specific examples. No claim element herein is to be construed under the provisions of 35 U.S.C. 112, sixth paragraph, unless the element is expressly recited using the phrase "means for". Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

While one or more embodiments have been described with reference to the figures, it will be understood by those of ordinary skill in the art that various changes in form and details may be made therein without departing from the spirit and scope as defined by the following claims.

What is claimed is:

1. An imaging lens comprising:
   a first lens having a negative refractive power;
   a second lens having a positive refractive power and having a convex object side surface;
   a third lens having a negative refractive power;
   a fourth lens having a convex image side surface; and
   a fifth lens having an image side surface, the image side surface having an inflection point,
   wherein, the first, second, third, fourth, and fifth lenses are sequentially arranged from a front end of the imaging lens to a rear end of the imaging lens, and the imaging lens satisfies the following condition:

$2.1 < f < 2.8$ $D_{p5s2i} - D_{p5s2m} < 0.74$ wherein f denotes a focal length of the imaging lens, $D_{p5s2i}$ denotes a length on an optical axis from the image side surface of the fifth lens to an image plane associated with the lens, and $D_{p5s2m}$ denotes a length from a point of the image side surface of the fifth lens on the optical axis to a point projected on the optical axis from a most convex point of the image side surface of the fifth lens.

2. The imaging lens of claim 1, wherein the imaging lens satisfies the following condition:

$40.0° < \omega < 46.5°$ wherein $\omega$ denotes a half view angle of the imaging lens.

3. The imaging lens of claim 1, wherein the imaging lens satisfies the following condition:

$-14 < R6 < 5$ wherein R6 denotes a curvature radius of an image side surface of the third lens.

4. The imaging lens of claim 3, wherein the third lens has a meniscus shape and the image side surface of the third lens is convex.

5. The imaging lens of claim 3, wherein the third lens has a meniscus shape and the image side surface of the third lens is concave.

6. The imaging lens of claim 1, wherein the fourth lens has a positive refractive power.

7. The imaging lens of claim 1, wherein the fifth lens has a negative refractive power.

8. The imaging lens of claim 1, wherein an object side surface of the first lens is convex.

9. The imaging lens of claim 1, wherein the imaging lens satisfies the following condition:

$15 < V3 < 26$ wherein V3 denotes an Abbe number of the third lens.

10. The imaging lens of claim 1, wherein the imaging lens satisfies the following condition:

$50 < V2 < 60$ $50 < V4 < 60$ $50 < V5 < 60$ wherein V2 denotes an Abbe number of the second lens, V4 denotes an Abbe number of the fourth lens, and V5 denotes an Abbe number of the fifth lens.

11. The imaging lens of claim 1, wherein the imaging lens satisfies the following condition:

$0.5 < f2/f < 1.0$ wherein f2 denotes a focal length of the second lens, and f denotes a focal length of the imaging lens.

12. The imaging lens of claim 1, wherein the imaging lens satisfies the following condition:

$0.3 < f4/f < 1.0$ wherein f4 denotes a focal length of the fourth lens, and f denotes the focal length of the imaging lens.

13. The imaging lens of claim 1, wherein the imaging lens satisfies the following condition:

$-4.0 < f3/f < -1.0$ wherein f3 denotes a focal length of the third lens, and f denotes the focal length of the imaging lens.

14. The imaging lens of claim 1, wherein the imaging lens satisfies the following condition:

$-1.2 < f5/f < 0$ wherein f5 denotes a focal length of the fifth lens, and f denotes the focal length of the imaging lens.

15. The imaging lens of claim 1, wherein the imaging lens satisfies the following condition:

$1.8 < CT4/CT3 < 4.0$ wherein CT4 and CT3 respectively denote thicknesses of the third and fourth lenses.

16. An imaging apparatus comprising:
the imaging lens of claim 1; and
an image sensor configured to convert an optical image formed through the imaging lens into an electrical signal.

\* \* \* \* \*